United States Patent
Zhang et al.

(10) Patent No.: US 12,413,139 B2
(45) Date of Patent: Sep. 9, 2025

(54) CONTROL CIRCUIT AND CONTROL METHOD FOR THREE-LEVEL DC-DC CONVERTER

(71) Applicant: Silergy Semiconductor Technology (Hangzhou) LTD, Hangzhou (CN)

(72) Inventors: Shuai Zhang, Hangzhou (CN); Zhen Zhang, Hangzhou (CN); Wang Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 303 days.

(21) Appl. No.: 18/110,631

(22) Filed: Feb. 16, 2023

(65) Prior Publication Data

US 2023/0291304 A1  Sep. 14, 2023

(30) Foreign Application Priority Data

Mar. 11, 2022  (CN) .......................... 202210239205.X

(51) Int. Cl.
| | |
|---|---|
| *H02M 3/158* | (2006.01) |
| *H02M 1/00* | (2006.01) |
| *H02M 1/088* | (2006.01) |
| *H02M 1/32* | (2007.01) |

(52) U.S. Cl.
CPC ......... *H02M 1/322* (2021.05); *H02M 1/0095* (2021.05); *H02M 1/088* (2013.01); *H02M 3/158* (2013.01)

(58) Field of Classification Search
CPC ...... H02M 3/156; H02M 3/155; H02M 3/157; H02M 3/158; H02M 3/1582; H02M 3/1584; H02M 1/322; H02M 1/0095; H02M 1/008
See application file for complete search history.

(56) References Cited

U.S. PATENT DOCUMENTS

| | | |
|---|---|---|
| 8,581,518 B2 | 11/2013 | Kuang et al. |
| 9,866,113 B1* | 1/2018 | Assaad .................. H02M 3/158 |
| 2011/0127925 A1 | 6/2011 | Huang et al. |
| 2017/0318639 A1 | 11/2017 | Wang et al. |

(Continued)

FOREIGN PATENT DOCUMENTS

| | | |
|---|---|---|
| CN | 107346940 A | 11/2017 |
| CN | 108566092 B | 9/2018 |

(Continued)

*Primary Examiner* — Nguyen Tran

(57) ABSTRACT

A method of controlling a three-level DC-DC converter having first, second, third, and fourth power switches coupled in series between an input voltage and a reference ground, and a flying capacitor coupled between a common node of the first and second power switches and a common node of the third and fourth power switches, can include: operating the flying capacitor in a first mode in which the voltage across the flying capacitor is controlled to not be decreased in at least two consecutive first intervals, where each first interval is half of a switching period of the three-level DC-DC converter; and operating the flying capacitor in a second mode in which the voltage across the flying capacitor is controlled not to be increased in at least two consecutive first intervals, such that the voltage across the flying capacitor approaches a predetermined value.

18 Claims, 8 Drawing Sheets

(56) References Cited

U.S. PATENT DOCUMENTS

| | | |
|---|---|---|
| 2018/0295685 A1 | 10/2018 | Wang et al. |
| 2018/0295690 A1 | 10/2018 | Chen et al. |
| 2018/0310376 A1 | 10/2018 | Huang et al. |
| 2021/0152100 A1* | 5/2021 | Zilio .................. H02M 7/4837 |
| 2021/0359606 A1 | 11/2021 | Han et al. |
| 2022/0029540 A1 | 1/2022 | Zhang et al. |
| 2022/0321008 A1* | 10/2022 | Choi .................. H02M 1/0095 |

FOREIGN PATENT DOCUMENTS

| | | |
|---|---|---|
| CN | 112019052 A | 12/2020 |
| CN | 1112821757 A | 5/2021 |

* cited by examiner

CONTROL CIRCUIT AND CONTROL METHOD FOR THREE-LEVEL DC-DC CONVERTER

RELATED APPLICATIONS

This application claims the benefit of Chinese Patent Application No. 202210239205.X, filed on Mar. 11, 2022, which is incorporated herein by reference in its entirety.

FIELD OF THE INVENTION

The present invention generally relates to the field of power electronics, and more particularly to power converters and associated control circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
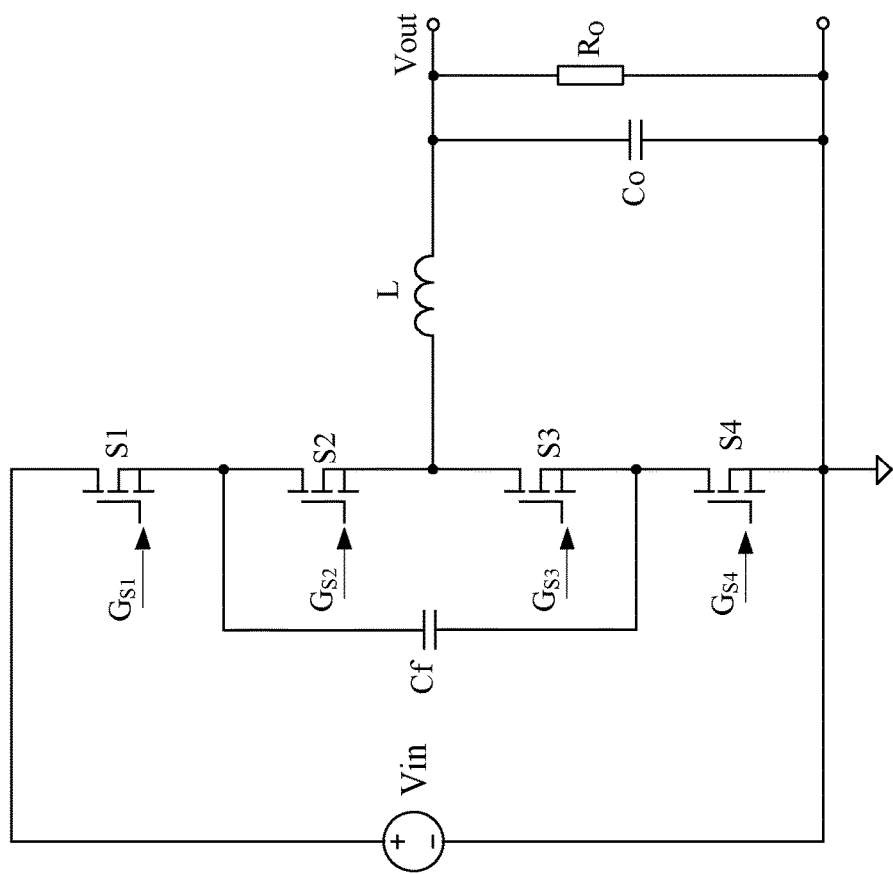
FIG. 1 is a schematic circuit diagram of an example three-level DC-DC converter.

Referring now to FIG. 1, shown is a schematic circuit diagram of an example three-level DC-DC converter. This particular example three-level Buck converter can include power switches S1-S4, flying capacitor Cf, inductor L, and output capacitor Co. For example, driving signals $G_{S1}$ and $G_{S4}$ of power switches S1 and S4 are complementary, and driving signals $G_{S2}$ and $G_{S3}$ of power switches S2 and S3 are complementary. Moreover, the duty ratios of driving signals $G_{S1}$ and $G_{S2}$ are equal, and phase difference α between driving signals $G_{S1}$ and $G_{S2}$ is 180 degrees (π radians).

The ideal operating condition of three-level Buck converter is that the voltage across flying capacitor Vcf is equal to ½Vin. At this time, the voltage that each power switch bears in the three-level Buck converter is half of Vin, and the inductor current has the effect of frequency doubling. In fact, due to the tolerance of devices and parasitic parameters of the circuit, voltage Vcf across the flying capacitor may be unbalanced, which may impact the best operating condition of a three-level Buck converter. Therefore, a voltage balancing strategy, such as phase-shifting control may be utilized to balance the voltage across the flying capacitor and ensure that it equals to ½ Vin. However, when the input voltage jumps/transitions rapidly and the load changes suddenly, the instantaneous value of the voltage across the flying capacitor can greatly deviate from ½ Vin. Therefore, it may be necessary to quickly and actively adjust the voltage across the flying capacitor under bad or non-ideal operating conditions.

Figure 2:
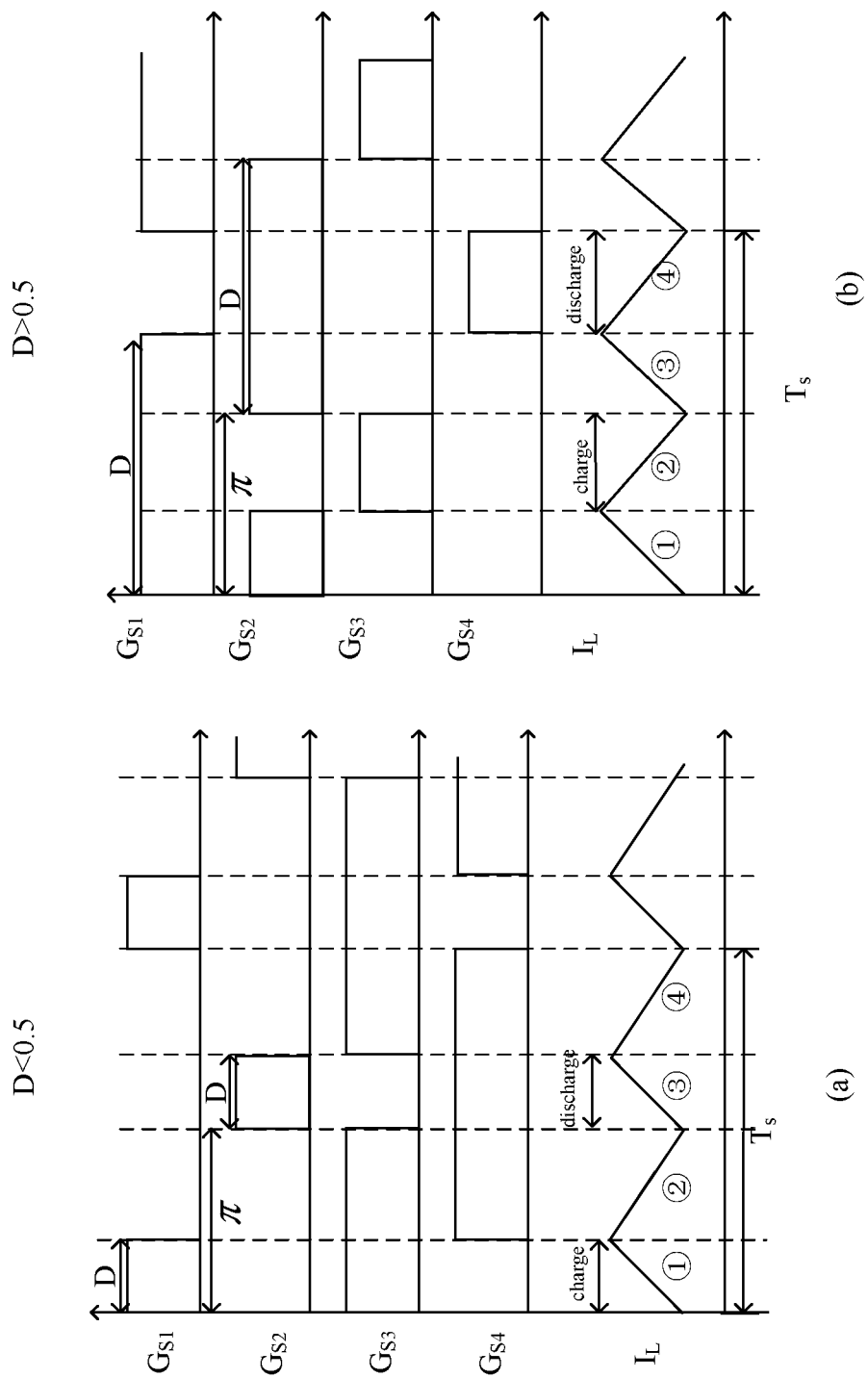
FIG. 2 is a waveform diagram of example operation of the three-level DC-DC converter.

Referring now to FIG. 2, shown is a waveform diagram of example operation of the three-level DC-DC converter. Portion (a) of FIG. 2 shows the operating waveform of a three-level Buck converter when duty ratio D is less than 0.5, and portion (b) of FIG. 2 shows the operating waveform of the three-level Buck converter when duty ratio D is greater than 0.5. When duty ratio D is less than 0.5, there are four operating stages in one switching period Ts: ①-④. In the operating stage ① (e.g., charging stage): power switches S1 and S3 are turned on, input voltage Vin charges flying capacitor Cf, and inductor current IL rises. In the operating stage ② (e.g., holding stage): power switches S3 and S4 are turned on, inductor current IL freewheels through power switches S3 and S4 and drops, and the voltage across flying capacitor Cf remains unchanged. In the operating stage ③ (e.g., discharging stage): power switches S2 and S4 are turned on, flying capacitor Cf is discharged, and inductor current IL rises. In the operating stage ④ (e.g., holding stage): as in the operating stage ②, power switches S3 and S4 are turned on, and inductor current IL continues to freewheel. The duration of the operating stage ① plus the duration of the operating stage ② is Ts/2, the duration of the operating stage ③ plus the duration of the operating stage ④ is Ts/2, and Ts is the switching period.

When duty ratio D is greater than 0.5, there are four operating stages in one switching period Ts: ①-④. In the operating stage ① (e.g., holding stage): power switches S1 and S2 are turned on, inductor L stores energy through input voltage Vin, inductor current IL rises, and the voltage across flying capacitor Cf remains unchanged. In the operating stage ② (e.g., charging stage): power switches S1 and S3 are turned on, input voltage Vin and inductor L jointly charge flying capacitor Cf, and inductor current IL drops. In the operating stage ③ (e.g., holding stage): power switches S1 and S2 are turned on, which is the same as the operating stage ①. In the operating stage ④ (e.g., discharge stage): power switches S2 and S4 are turned on, flying capacitor Cf is discharged, and inductor L also releases energy to the load, and inductor current IL drops. The duration of the operating stage ① plus the duration of the operating stage ② is Ts/2, the duration of the operating stage ③ plus duration of the operating stage ④ is Ts/2, and Ts is the switching period.

In this way, in one switching period Ts, the operating process of a three-level Buck converter can include a charging stage and a discharging stage, and in order to meet the balance of the inductor, both the charging stage and the discharging stage follow a holding stage. Therefore, in one switching period Ts in the normal operating mode, a time length of one charging stage and one holding stage is Ts/2, and a time length of one discharging stage and one holding stage is Ts/2.

In particular embodiments, when voltage Vcf across the flying capacitor deviates far from the predetermined value, it can be quickly pulled back to the predetermined value (½Vin here). The control method of certain embodiments may adjust the sequence and times of charging and discharging processes of flying capacitor Cf according to the extent that voltage Vcf across the flying capacitor deviates from the predetermined value (½Vin), such that voltage Vcf across the flying capacitor can approach the predetermined value. Here, a first threshold range can be set, which has an upper threshold much greater than the predetermined value and a lower threshold much less than the predetermined value. When voltage Vcf across the flying capacitor is out of the first threshold range, this may indicate that voltage Vcf across the flying capacitor deviates far from the predetermined value, and flying capacitor Cf can be controlled to be consecutively charged or discharged for many times, such that voltage Vcf across the flying capacitor can approach the predetermined value.

For example, when the voltage across the flying capacitor is less than the lower threshold of the first threshold range, the flying capacitor Cf can be controlled to operate in a first mode in which the voltage across the flying capacitor is controlled not to be decreased in at least two consecutive first intervals. That is, flying capacitor Cf can be controlled to operate in the undervoltage operating mode (e.g., the first mode) to be consecutively charged for many times. When the voltage across the flying capacitor is greater than the upper threshold of the first threshold range, flying capacitor Cf can be controlled to operate in a second mode in which the voltage across the flying capacitor is controlled not to be increased in at least two consecutive first intervals. That is, flying capacitor Cf may be controlled to enter the overvoltage operating mode (e.g., the second mode) to be consecutively discharged for many times, where the first interval, e.g., is half of switching period Ts.

It should be understood that the fast capacitor balancing strategy of particular embodiments may quickly pull the voltage across the flying capacitor back to the predetermined value (½Vin) when the voltage across the flying capacitor is outside the first threshold range; that is, it deviates from the predetermined value (½Vin) to a great extent. Therefore, when the voltage across the flying capacitor approaches the predetermined value, the converter can return to the normal operating mode, where the charging stage and the discharging stage are alternately performed in each switching period, as shown in FIG. 2. Moreover, in the normal operating mode, the control circuit can implement other existing capacitor balancing strategies, such as phase shift control, to accurately control voltage Vcf across flying capacitor Cf to be further equal to the predetermined value (½Vin).

In addition, the mentioned "consecutively" may not strictly mean that one discharging stage directly follows the next, but that there should be at least one holding stage between two adjacent discharging stages. Here, the interval between the starting position of the previous discharging stage and the starting position of the next discharging stage is the discharging interval Td, which is equal to an integer multiple of Ts/2; that is, Td=mTs/2, so as to meet the balance of the inductor, where m is a positive integer. One discharging interval can include one discharging stage, and the rest is the holding stage. When duty ratio D is less than 0.5, the duration of the discharging stage is DTs, so the duration of the holding stage in each discharging interval is mTs/2−DTs.

When duty ratio D is greater than 0.5, the duration of the discharging stage is (1−D)Ts, so the duration of the holding stage in each discharge interval is mTs/2−(1−D)Ts. Similarly, the same can be true for being consecutively charged for many times. The interval between the starting position of the previous charging stage and the starting position of the next charging stage is charging interval Tc, which may be equal to an integer multiple of Ts/2; that is, Tc=mTs/2. One charging interval can include one charging stage, and the rest is the holding stage. When duty ratio D is less than 0.5, the duration of the charging stage is DTs, so the duration of the holding stage in each charging interval is mTs/2−DTs. When duty ratio D is greater than 0.5, the duration of the charging stage is (1−D)Ts, so the duration of the holding stage in each charging interval is mTs/2−(1−D)Ts.

It should be understood that m may determine the duration of the holding stage, which is also related to the rapidity and stability of the converter. If m is too large, the speed at which the voltage across the flying capacitor reaches the predetermined value can decrease. Also, when duty cycle D is less than 0.5, the freewheeling time of the inductor may be too long, such that the inductor current decreases too much and the circuit cannot work normally. When duty cycle D is greater than 0.5, the energy storage time of the inductor may be too long, so the inductor current can increase too much, which also may affect the normal operation of the circuit. If m is too small, the control of the converter may be unstable. Therefore, the value of m needs to be selected according to the particular operating situation.

However, because the driving circuit of the three-level Buck converter may need multiple driving power supply capacitors, the voltages of these driving power supply capacitors may also be related to the different switching states of the three-level Buck converter. Therefore, when the three-level Buck converter is continuously discharged or charged for many times, the energy of some driving power supply capacitors may not be supplemented, such that the corresponding power switch cannot be driven normally. The following will briefly analyze the power supply principle of the driving circuit of the three-level Buck converter.

Figure 3:
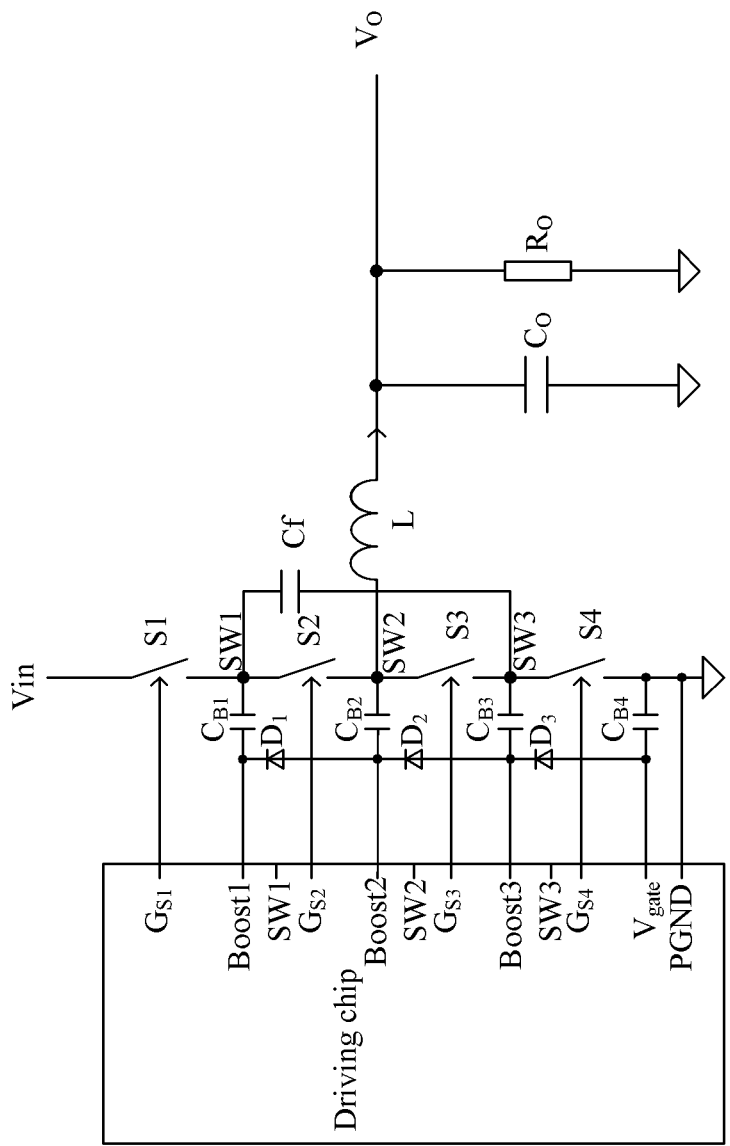
FIG. 3 is a schematic block diagram of an example driving circuit of a three-level DC-DC converter, in accordance with embodiments of the present invention.

Referring now to FIG. 3, shown is a schematic diagram of an example driving circuit of a three-level DC-DC converter, in accordance with embodiments of the present invention. In this particular example, voltage $V_{gate}$ is the power supply voltage for driving the power switch, which can supply power to a driving amplifier (not shown here) to output a driving signal, and $C_{B1}$-$C_{B3}$ are driving power supply capacitors. The power supply for driving power switch S3 may be provided by capacitor $C_{B3}$.

When power switch S4 is turned on, diode D3 can be in the conduction state, and voltage $V_{gate}$ may charge capacitor $C_{B3}$, such that when the turn-on signal of power switch S3 comes, a driving signal can be output to turn on power switch S3. The power supply for driving power switch S2 may be provided by capacitor $C_{B2}$. When power switch S3 is turned on, diode $D_2$ can be in the conduction state, and capacitor $C_{B3}$ may discharge to charge capacitor $C_{B2}$, thus preparing for the turn-on of power switch S2. The power supply for power switch S1 may be provided by capacitor $C_{B1}$. When power switch S2 is turned on, diode $D_1$ may be in the conduction state, capacitor $C_{B2}$ can discharge to charge capacitor $C_{B1}$, thus preparing for the turn-on of power switch S1. It should be understood that the types of power switches S1 to S4 are the same in general. In order to make the voltages of these capacitors relatively close, it can be selected that $C_{B3}=3C_{B1}$ and $C_{B2}=2C_{B1}$.

When duty ratio D is less than 0.5 (D<0.5), and the flying capacitor is continuously charged, since there is no discharging stage, that is, there is no operating stage ③ in (a) of FIG. 2, power switch S2 may remain in the off state, such that the energy of capacitor $C_{B1}$ is never supplemented, thus causing the voltage of capacitor $C_{B1}$ to continue to drop. When the voltage of capacitor $C_{B1}$ is too low, power switch S1 may not be turned on reliably, and the circuit may not operate normally. Similarly, when D>0.5 and the flying capacitor is charged continuously, since there is no discharging stage, that is, there is no operating stage ④ in (b) of FIG. 2, power switch S4 may remain off, and capacitor $C_{B3}$ may not be charged. Also, the energy of capacitors $C_{B2}$ and $C_{B1}$ can be supplied from capacitor $C_{B3}$, so the energy of capacitors $C_{B1}$-$C_{B3}$ may not be supplemented. When the flying capacitor is continuously discharged, since there is no charging stage, that is, there is no stage ② in (b) of FIG. 2, power switch S3 may remain in the off state, so capacitor $C_{B2}$ may not be charged, and the energy of capacitor $C_{B1}$ may not be supplemented. Therefore, the number of times for continuous charging (discharging) can be limited in such cases.

In order to avoid the above situation, the control method of certain embodiments may also include, in the undervoltage operating mode, controlling the flying capacitor to enter the discharging supplementary mode after every N charging stages, in order to discharge at least once. For example, in the discharging supplementary mode, the flying capacitor can be controlled to enter the discharging stage once, in order to supplement the energy for the driving power supply capacitor, and then return to the undervoltage operating mode to be charged consecutively. In this way, the driving power supply capacitor can be supplemented with the energy only once, which may not be enough to completely supplement the energy for the driving power supply capacitor. Thus, at least one alternate charging and discharging process can be performed (that is, entering the normal operating mode for a predetermined period of time) before returning to the undervoltage operating mode, in order to compensate the energy of the driving power supply capacitor for many times.

In the overvoltage operating mode, after every N discharging stages, the flying capacitor can be controlled to enter the charging supplementary mode to charge at least once. In the charging supplementary mode, the flying capacitor may be controlled to enter the charging stage once, such that the energy for the driving power supply capacitor is supplemented. Then, the flying capacitor can be controlled to return to the overvoltage operating mode to be discharged consecutively. In this way, the driving power supply capacitor can be supplemented with the energy only once, which may not be enough to completely supplement the energy for the driving power supply capacitor. Thus, at least one alternate discharge and charging process can be performed (that is, entering the normal operating mode for a period of time) before returning to the overvoltage operating mode, in order to compensate the energy of the driving power supply capacitor for many times.

Here, the duration of the discharging/charging supplementary mode is kTs/2, and k is a positive integer. In the case of only one energy supplement, the duration of the discharging/charging stage is DTs (when D<0.5) or (1−D)$T_s$ (when D>0.5), and the other time is the holding stage. When the capacitor energy is supplemented for many times, one discharging process and one charging process can be performed alternately by Ts/2. For the convenience of description, k=1 is used in the following description; that is, the driving power supply capacitor is only supplemented once every N times of continuous charging or discharging, and N is a positive integer greater than 1.

The selection principle of the number of times of continuous charging (discharging) can be that after N times of charging or discharging, the minimum voltage of the driving power supply capacitor is not less than a minimum allowable value. For the convenience of explanation, Qg is defined as the amount of charge required for the driving power supply capacitor to turn on the power switch once, $C_B$ is the capacitance of the driving power supply capacitor (in fact, $C_{B1}$-$C_{B3}$ are substituted into $C_B$ respectively), n is the number of times that the power switch is turned on continuously, and β is the maximum allowable percentage of the voltage drop of the driving power supply capacitor; that is, the minimum allowable value of the capacitor voltage is $(1-\beta)V_{gate}$. Thus, the following formula can be met:

$$V_{gate}Q_g n \le \frac{1}{2}C_B V_{gate}^2 \left[1-(1-\beta)^2\right] \quad (1)$$

Here, the left side of formula (1) is the energy required for the power supply capacitor to turn on the power switch for n times, and the right side is the maximum energy that can be provided when the voltage of the driving power supply capacitor drops by β. Formula (2) can be obtained from formula (1) as below:

$$n \le \frac{C_B V_{gate}(2\beta-\beta^2)}{2Q_g} \quad (2)$$

Therefore, predetermined number N for continuous discharging or charging of the flying capacitor may be less than or equal to n, whereby N is a positive integer.

Figure 4:
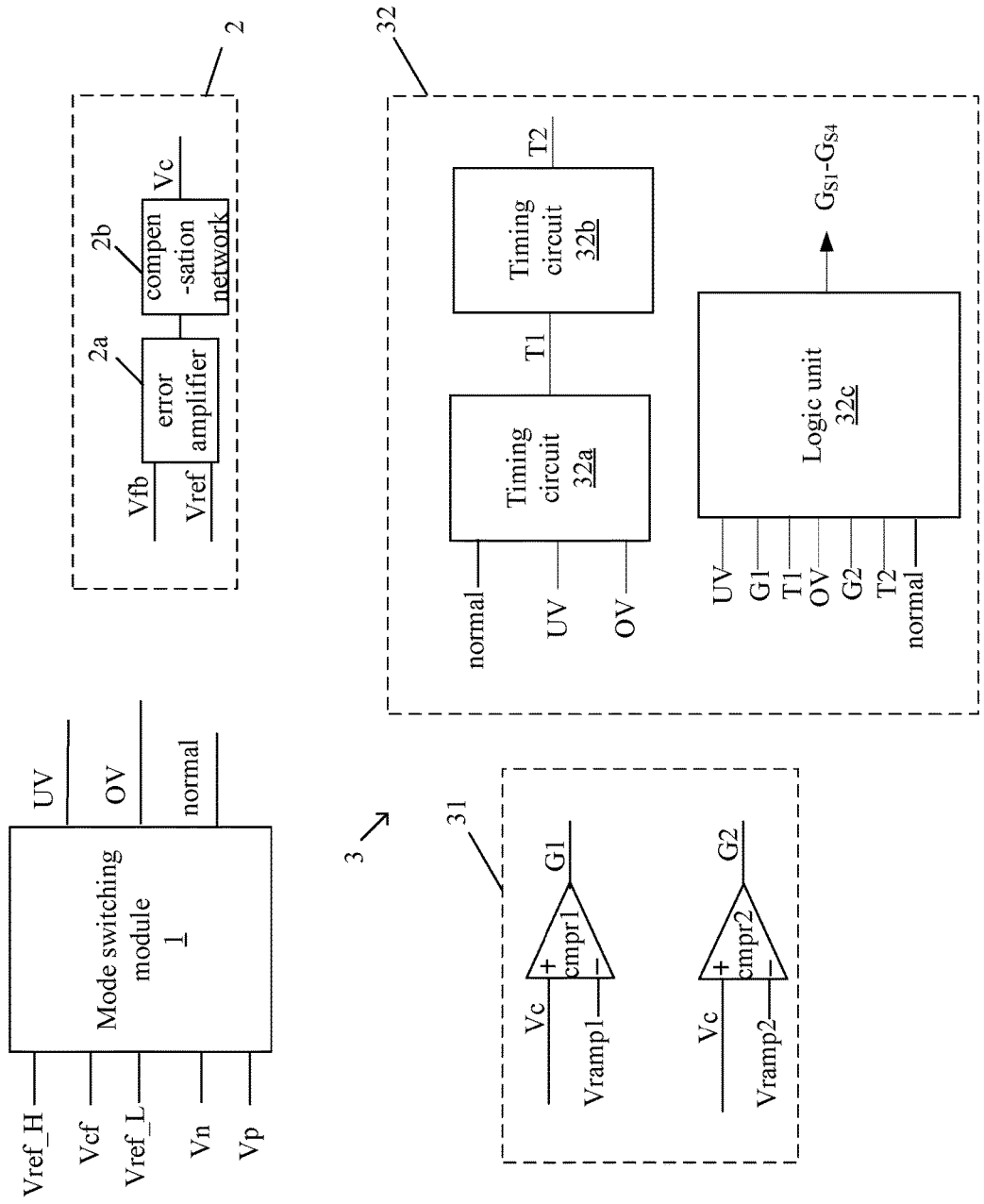
FIG. 4 is a schematic block diagram of an example control circuit of a three-level DC-DC converter, in accordance with embodiments of the present invention.

Referring now to FIG. 4, shown is a schematic diagram of an example control circuit of a three-level DC-DC converter, in accordance with embodiments of the present invention. In this example, the control circuit can adjust the execution sequence and times of charging and discharging of flying capacitor Cf according to the extent that voltage Vcf across flying capacitor Cf deviates from the predetermined value (here, ½Vin), so that voltage Vcf across flying capacitor Cf can quickly approach the predetermined value. For example, the control circuit can include mode switching module 1, feedback compensation circuit 2, and driving generation circuit 3.

Mode switching module 1 can receive voltage Vcf across the flying capacitor and control the three-level DC-DC converter to switch between different operating modes according to the deviation of voltage Vcf across the flying capacitor from the predetermined value. Feedback compensation circuit 2 can generate feedback compensation signal Vc according to an error between feedback signal Vfb characterizing output voltage Vout and reference signal Vref characterizing the expected value of the output voltage. Driving generation circuit 3 can generate corresponding driving signals according to feedback compensation signal Vc and different indication signals (e.g., overvoltage indication signal OV, undervoltage indication signal UV, and normal indication signal 'normal') output by mode switching module 1, in order to control the converter to operate in the corresponding operating mode.

Mode switching module 1 can compare voltage Vcf across the flying capacitor with different thresholds, and output different indication signals (e.g., overvoltage indication signal OV, undervoltage indication signal UV, and the normal indication signal) to indicate the operating mode of the converter. When voltage Vcf across the flying capacitor is less than lower threshold Vref_L of the first threshold range, normal indication signal 'normal' can be active and under-voltage indication signal UV active. When voltage Vcf across the flying capacitor is greater than upper threshold Vref_H of the first threshold range, overvoltage indication signal OV can be active and normal indication signal 'normal' may be inactive. When voltage Vcf across the flying capacitor approaches the predetermined value from outside the first threshold range, normal indication signal 'normal' can be active.

In some embodiments, a second threshold range can be set, and the upper threshold of the second threshold range is Vp, slightly greater than the predetermined value of ½Vin, and the lower threshold of the second threshold range is Vn, slightly less than the predetermined value of ½Vin. Thus, when the voltage across the flying capacitor enters the second threshold range from outside the first threshold range, it can indicate that it approaches the predetermined value, and then the operating mode is switched back to the normal operating mode. In other example, Vp and Vn can be equal; that is, the same value near ½Vin. Further, feedback compensation circuit 2 can include error amplifier 2a for receiving feedback signal Vfb and reference signal Vref to generate an error signal; and compensation network 2b for compensating the error signal, in order to generate feedback compensation signal Vc.

Driving generation circuit 3 can include driving generation circuit 31 and driving generation circuit 32. In this example, driving generation circuit 31 can generate control signal G1 according to feedback compensation signal Vc and sawtooth wave signal Vramp1, and may generate control signal G2 according to feedback compensation signal Vc and sawtooth wave signal Vramp2. For example, the periods of sawtooth wave signal Vramp1 and sawtooth wave signal Vramp2 are equal to the switching period and the peak-to-peak values of the two are equal, and the phase difference between the first and second sawtooth wave signals is π. For example, driving generation circuit 31 can include comparator cmpr1, having non-inverting input terminal for receiving feedback compensation signal Vc, an inverting input terminal for receiving sawtooth wave signal Vramp1, and an output terminal for generating control signal G1.

Driving generation circuit 31 can also include comparator cmpr2, having a non-inverting input terminal for receiving feedback compensation signal Vc, an inverting input terminal for receiving sawtooth signal Vramp2, and an output terminal for generating control signal G2. Driving generation circuit 32 can generate corresponding driving signals $G_{S1}$-$G_{S4}$ according to the received control signals G1 and G2 and various indication signals (e.g., including overvoltage indication signal OV, undervoltage indication signal UV, and normal indication signal 'normal'). For example, driving generation circuit 32 can include timing circuit 32a, timing circuit 32b, and logic unit 32c. Timing circuit 32a may start timing when normal indication signal 'normal' is inactive; that is, when the undervoltage or overvoltage indication signal is active.

When the timing time is equal to N×mTs/2, timing signal T1 is active to indicate the end of N times of continuous charging or discharging. Timing circuit 32b may start timing when timing signal T1 is active. Timing circuit 32b may stop timing when the timing time reaches kTs/2, and then timing signal T2 becomes active, whereby the timing time of timing circuit 32b is the duration of the discharging/charging supplement mode. When timing signal T2 is active, timing circuit 32a may start to re-time, and so on, until normal indication signal 'normal' is active, and then both timing circuits may stop operating. Logic unit 32c can output corresponding driving signals $G_{S1}$-$G_{S4}$ according to control signals G1 and G2, each indication signal, and timing signals T1 and T2. Here, driving signals $G_{S1}$ and $G_{S4}$ respectively for power switches S1 and S4 are complementary, and driving signals $G_{S2}$ and $G_{S3}$ respectively for power transistors S2 and S3 are complementary. It should be understood that this represents only one way to determine the end of N times of charge/discharge by timing, and in other examples, it can also be realized by counting. In that case, the first timing circuit can be replaced by a counting circuit, and when it is detected that the N times of charge/discharge are completed, the second timing circuit can be instructed to operate.

When voltage Vcf across the flying capacitor is greater than upper threshold Vref_H, overvoltage indication signal OV generated by mode switching module 1 can be active. Then, driving generation circuit 3 may generate corresponding driving signals to control the converter to enter the overvoltage operating mode, in which flying capacitor Cf continuously enters the discharging stage for many times consecutively. When voltage Vcf across the flying capacitor is less than lower threshold Vref_L, undervoltage indication signal UV generated by mode switching mode 1 can be active. Then, driving generation circuit 3 may generate the corresponding driving signals to control the converter to enter the undervoltage operating mode. In this mode, flying capacitor Cf can enter the charging stage for many times consecutively. It should be understood that each charging stage or discharging stage may be followed by a holding stage, such that one charging/discharging stage plus one holding stage is equal to Ts/2.

Therefore, if the flying capacitor is in the charging or discharging stage before entering the overvoltage or undervoltage operating mode, it can be charged or discharged consecutively after one holding stage. If the flying capacitor is in the holding stage at this time, it can directly enter the charging stage to be charged consecutively or directly enter the discharging stage to be discharged consecutively. When voltage Vcf across the flying capacitor approaches the predetermined value from outside the first threshold range, normal indication signal 'normal' generated by mode switching mode 1 may be active. Then, driving generation circuit 3 may generate the corresponding driving signals to control the converter to enter the normal operating mode, such that the charging stage and the discharging stage are alternately performed in each switching period.

In the undervoltage operating mode, when duty cycle D is less than 0.5, at the beginning of each charging interval Tc, driving signal G1 can change from inactive to active to control power switch S1 to be turned on, and the conduction time may be equal to the conduction time of power switch S1 in the normal operating mode; that is, equal to DTs. At this time, driving signal $G_{S2}$ can be inactive in each charging interval; that is, power switch S2 may not be turned on during the charging interval. Since driving signal $G_{S3}$ is complementary to driving signal $G_{S2}$, and driving signal $G_{S4}$ is complementary to driving signal $G_{S1}$, the switching state of power switch S3 can be opposite to that of power switch S2, and the switching state of power switch S4 opposite to that of power switch S1. In this case, the duration of the holding stage in each charging interval is mTs/2−DTs.

When duty cycle D is greater than 0.5, at the beginning of each charging interval Tc, driving signal $G_{S3}$ can change from inactive to active. Then, power switch S3 can be controlled to be turned on, and the conduction time is equal to the conduction time of power switch S3 in the normal operating mode; that is, equal to (1−D)Ts. At this time, power switch S4 may not be turned on during the charging interval. Since driving signals of power switches S1 and S4 are complementary, and driving signals of power switches S2 and S3 are complementary, the switching states of power switches S1 and S4 can be opposite, and the switching states of power switches S2 and S3 may be opposite. In this case, the duration of the holding stage in each charging interval is mTs/2−(1−D)Ts.

The first timing circuit (e.g., 32a) can start timing when undervoltage indication signal UV is active, may stop timing after the timing time reaches N×mTs/2, and may generate the active first timing signal to control the second timing circuit (e.g., 32b) to start timing, at which time the flying capacitor starts to discharge once to supplement the energy of the power supply capacitor. It should be understood that there are many ways to determine the completion of N times of charging, and any suitable approach can be utilized in certain embodiments. For example, the number of charging stages can also be counted, and when the counted value reaches N, a discharging action can be started.

Similarly, in the overvoltage operating mode, when duty cycle D is less than 0.5, at the beginning of each discharge interval Td, driving signal G2 may change from inactive to active to control power switch S2 to be turned on, and the conduction time can be equal to the conduction time of power switch S2 in the normal operating mode; that is, equal to DTs. However, driving signal G1 may be inactive in each discharging interval, that is, power switch S1 may not be turned on during each discharging interval. Since driving signal G3 is complementary to driving signal G2, driving signal G4 may be complementary to driving signal G1, such that the switching state of power switch S3 is opposite to that of power switch S2, and the switching state of power switch S4 is opposite to that of power switch S1. In this case, the duration of the holding stage in each discharging interval is mTs/2−DTs.

When duty cycle D is greater than 0.5, at the beginning of each discharging interval Td, driving signal G4 can change from inactive to active, power switch S4 may be controlled to be turned on, and the conduction time is the conduction time of power switch S4 in the normal operating mode, that is, equal to (1−D)Ts. However, power switch S3 may not be turned on during each discharging interval. Since the driving signals of power switches S1 and S4 are complementary, and the driving signals of power switches S2 and S3 are complementary, the switching states of power switches S1 and S4 can be opposite, and the switching states of power switches S2 and S3 may be opposite. In this case, the duration of the holding stage in each discharging interval is mTs/2−(1−D)Ts.

The first timing circuit can start timing when overvoltage indication signal OV is active, stop timing when the timing time reaches N×mTs/2, and may generate the active first timing signal to control the second timing circuit to start timing. At this time, the flying capacitor can start charging once to supplement the energy of the power supply capacitor. It should be understood that there are many ways to determine the completion of N times of discharging, and any suitable approach can be utilized in certain embodiments. For example, the number of discharging stages can also be counted, and when the counted value reaches N, a discharging action may begin.

Figure 5:
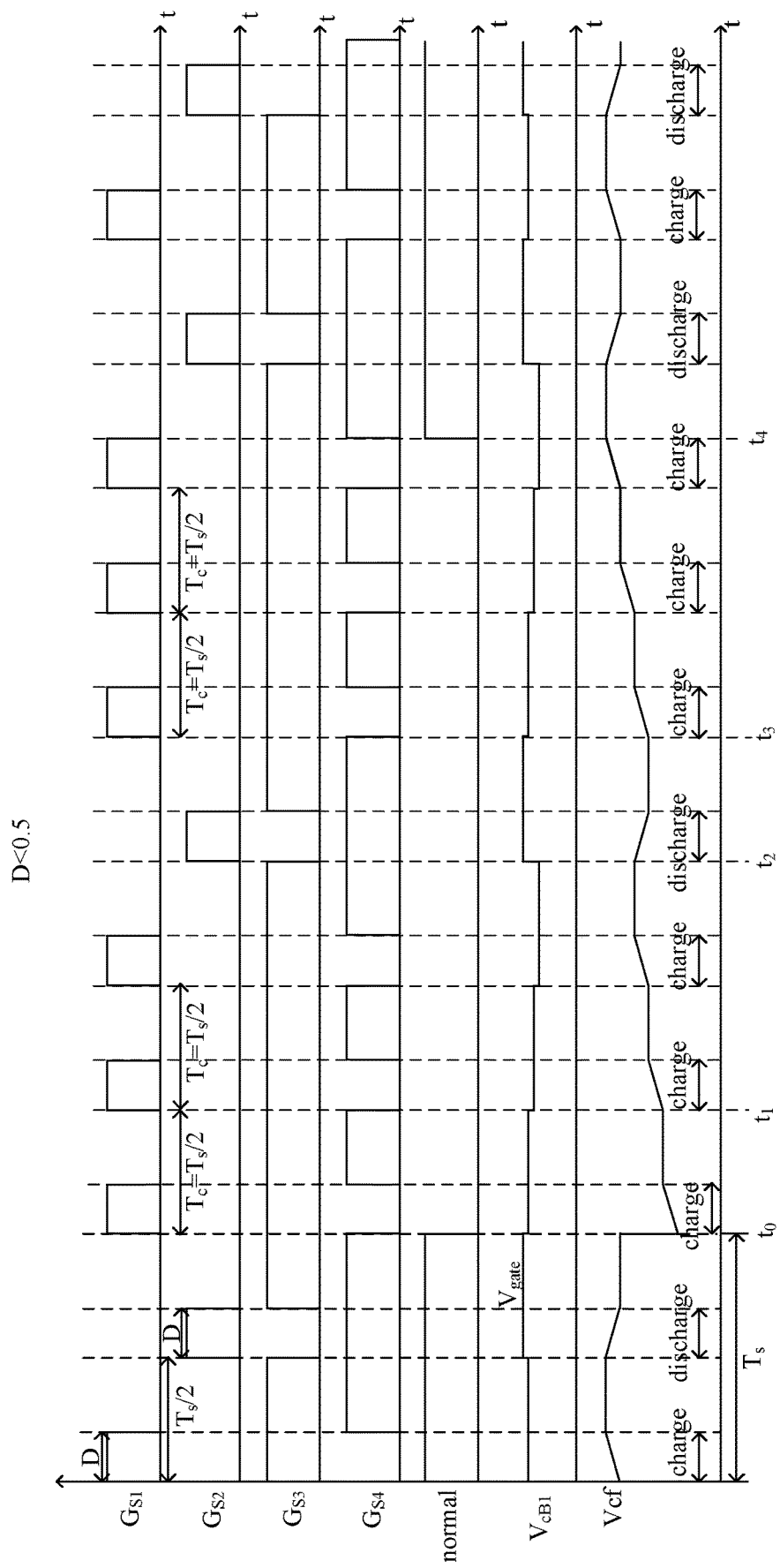
FIG. 5 is a waveform diagram of first example operation of the three-level DC-DC converter when D<0.5, in accordance with embodiments of the present invention.

Referring now to FIG. 5, shown is a waveform diagram of first example operation of the three-level DC-DC converter when D<0.5, in accordance with embodiments of the present invention. In this example, the operating waveform diagram of the three-level Buck converter when voltage Vcf across the flying capacitor is less than lower threshold Vref_L is given. In this example, if $C_{B3}=3C_{B1}$, $C_{B2}=2C_{B1}$, $C_{B1}=0.22$ Uf, $V_{gate}=5V$, $Q_g=30$ Nc, and $\beta=10\%$, then it can be obtained that N≤3 by substituting them into formula (2). Here, N=3, and Tc=Ts/2 are taken as examples.

Before time $t_0$, flying capacitor Cf can be alternately charged and discharged. At time t0, voltage Vcf across the flying capacitor may suddenly decrease, which is less than lower threshold Vref_L, that is, clearly less than ½Vin, and the deviation degree is high. Then, undervoltage indication signal UV can be active, and normal indication signal 'normal' may be inactive. Thus, the converter can enter the undervoltage operating mode, and the flying capacitor may enter the charging stage for three times consecutively, where the interval between the starting moments of adjacent charging stages is Ts/2. Because the flying capacitor is in the holding stage before time t0, it can directly enter the charging stage at time t0. Further, at time t0, driving signal $G_{S1}$ can change from inactive to active, and then power switch S1 may be turned on. Since driving signal $G_{S3}$ is also active, power switch S3 can be turned on, so voltage Vcf across the flying capacitor begins to rise.

After conduction time DTs of power switch S1 in the normal operating mode, driving signal $G_{S1}$ can change from active to inactive, and driving signal $G_{S4}$ can change from inactive to active. Since driving signal $G_{S3}$ is still active, the holding stage may be entered at this time, and voltage Vcf across the flying capacitor may remain unchanged until time $t_1$. Thereafter, the process during time period $t_0$-$t_1$ is repeated, and the duration between time $t_0$ and time $t_1$ is Ts/2. In addition, the first timing circuit may start timing from time $t_0$. When the timing time is equal to 1.5 Ts; that is, at time $t_2$, timing signal T1 is active, and the three-time charging process ends. During time period $t_0$-$t_2$, driving signal $G_{S2}$ may remain inactive, and power switch S2 may not be conductive during this period. In this example, since D<0.5, voltage $V_{cB1}$ of the driving power supply capacitor $C_{B1}$ can be minimized. Therefore, when timing signal T1 is active, timing circuit 32b may start timing, and flying capacitor Cf can enter the supplement discharging stage, such that voltage $V_{cB1}$ rises to power supply voltage $V_{gate}$ again.

When the timing time of timing circuit 32b is equal to 0.5 Ts, that is, at time $t_3$, timing signal T2 may be active, timing circuit 32a may restart timing, and the flying capacitor can be is charged for three times again. At time $t_4$, voltage Vcf across the flying capacitor may be pulled back to the vicinity of Vin/2, and thus normal indication signal 'normal' can be active. After that, the converter may switch to the normal operating mode, and the flying capacitor begins to be charged and discharged alternately. Also, the discharging stage can be performed first, and then the charging stage may be performed.

Figure 6:
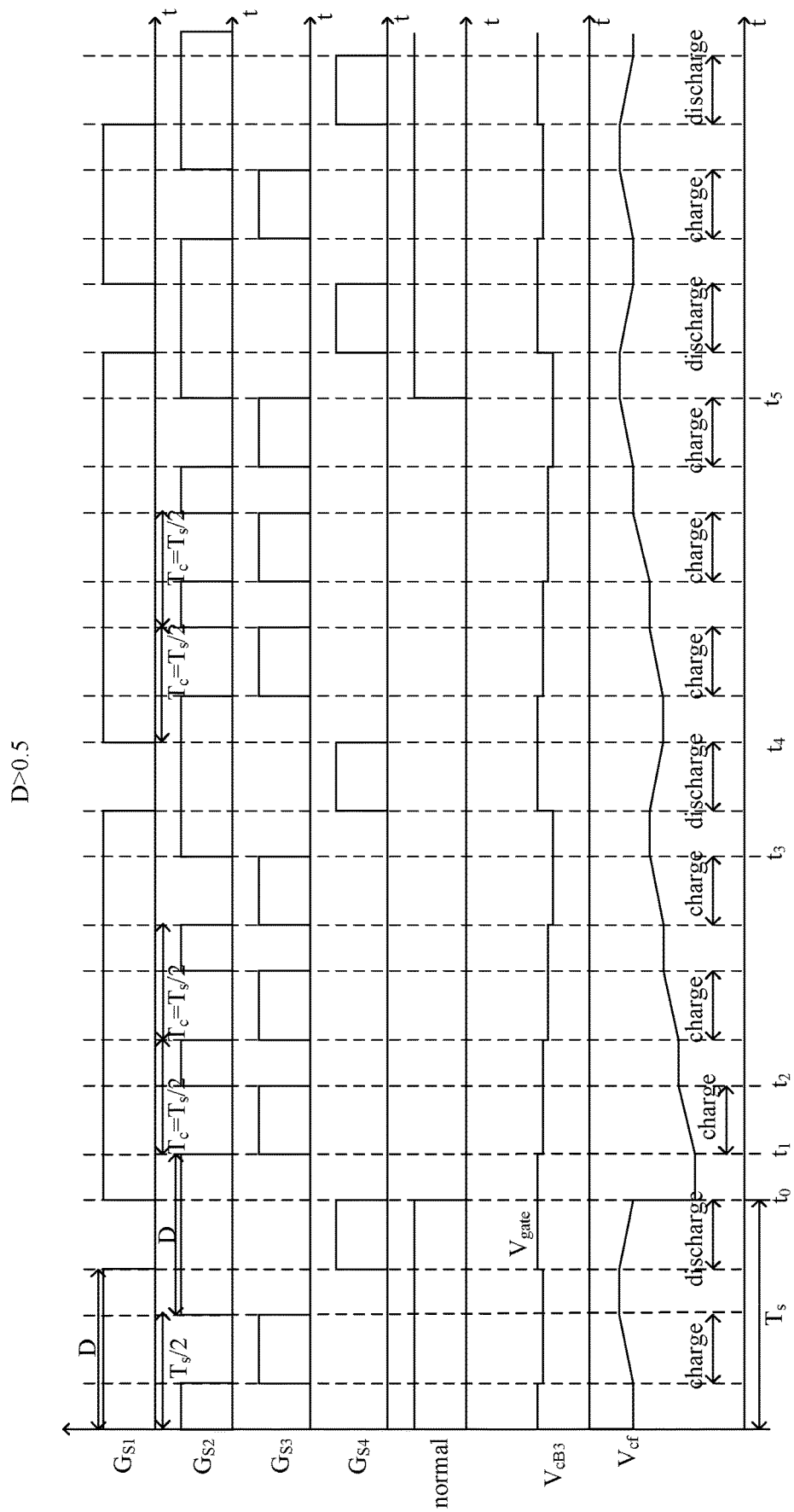
FIG. 6 is a waveform diagram of first example operation of the three-level DC-DC converter when D>0.5, in accordance with embodiments of the present invention.

Referring now to FIG. 6, shown is a waveform diagram of first example operation of the three-level DC-DC converter when D>0.5, in accordance with embodiments of the present invention. In this example, the operating waveform diagram of the three-level buck converter when voltage Vcf across the flying capacitor is less than lower threshold Vref_L is given, and the case of m=1 and N=3 are taken as examples for illustration.

Before time $t_0$, flying capacitor Cf can be alternately charged and discharged. At time $t_0$, voltage Vcf across the flying capacitor may suddenly decrease, which is less than lower threshold Vref_L, that is, clearly less than ½Vin, and the deviation degree is high. Then, undervoltage indication signal UV can be active, and normal indication signal 'normal' may be inactive. The converter may enter the undervoltage operating mode, and the flying capacitor can continuously enter the charging stage for three times consecutively. Also, the interval between the starting moments of adjacent charging stages is Ts/2. Because the flying capacitor is in the discharging stage before time $t_0$, at time $t_0$, driving signals $G_{S1}$ and $G_{S2}$ may be active, and the flying capacitor may first enter the holding stage.

At time $t_1$, driving signal $G_{S3}$ can change from inactive to active, and driving signal $G_{S2}$ may change from active to inactive, so power switch S3 can be turned on and power switch S2 turned off. Then, voltage Vcf across the flying capacitor can begin to rise. After the conduction time (1−D)Ts of power switch S3 in the normal operating mode, driving signal $G_{S3}$ may change from active to inactive, and driving signal $G_{S2}$ may change from inactive to active at time $t_2$. Then, the actions during time period $t_0$-$t_2$ may be repeated, and the duration between time period $t_0$-$t_2$ is Ts/2. In addition, timing circuit 32a may start timing from time $t_0$. When the timing time is equal to 1.5 Ts, that is, at time $t_3$, timing signal T1 may be active, and the three-time charging process can end. In this example, since duty cycle D>0.5, voltage $V_{cB3}$ of the driving power supply capacitor $C_{B3}$ can be minimized. Therefore, when t timing signal T1 is active, timing circuit 32b may start timing. Also, flying capacitor Cf may enter the supplement discharging stage, such that voltage $V_{cB3}$ rises to power supply voltage $V_{gate}$ again.

When the timing time of timing circuit 32b is equal to 0.5 Ts, that is, at time $t_4$, timing signal T2 can be active to inform timing circuit 32a to restart timing, and then the flying capacitor can be charged for three times again. At time $t_5$, voltage Vcf across the flying capacitor can be pulled back to near Vin/2, and the normal indication signal 'normal' may be active. After that, the converter can switch to the normal operating mode, and the flying capacitor may begin to be charged and discharged alternately.

Figure 7:
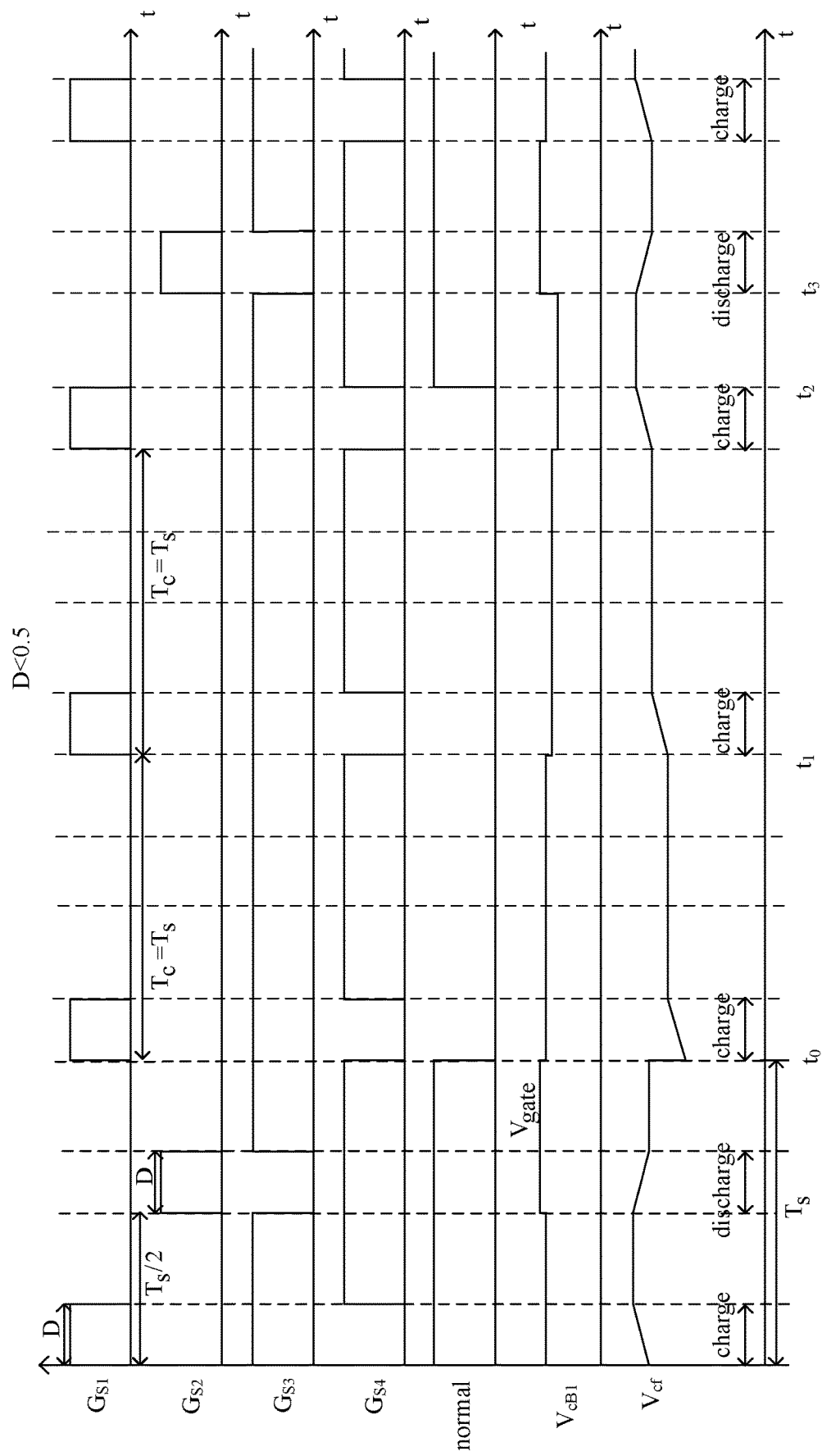
FIG. 7 is a waveform diagram of second example operation of the three-level DC-DC converter when D<0.5, in accordance with embodiments of the present invention.

Referring now to FIG. 7, shown is a waveform diagram of second example operation of the three-level DC-DC converter when D<0.5, in accordance with embodiments of the present invention. In this example, the operating waveform diagram of the three-level Buck converter when voltage Vcf across the flying capacitor is less than lower threshold Vref_L is given. Here, m=2 and N=3 are taken as an example for illustration.

Before time $t_0$, flying capacitor Cf can be alternately charged and discharged. At time $t_0$, voltage Vcf across the flying capacitor may suddenly drop to below lower threshold Vref_L, so under-voltage indication signal UV can be active and normal indication signal 'normal' may be inactive. Thus, the converter may enter the undervoltage operating mode, and the flying capacitor can continuously be charged for three times consecutively. Different from the previous example, the interval here between the starting moments of adjacent charging stages is Tc=mTs/2=Ts. Since the flying capacitor is in the holding stage before time $t_0$, it can directly enter the charging stage at time $t_0$. At time $t_0$, driving signal $G_{S1}$ may change from inactive to active, and power switch S1 can be turned on. Since driving signal $G_{S3}$ is also active, power switch S3 may be turned on, and thus voltage Vcf across the flying capacitor may begin to rise. After the conduction time DTs, driving signal $G_{S1}$ can change from active to inactive, driving signal $G_{S4}$ can change from inactive to active, and driving signal $G_{S3}$ may remain active. At this time, the holding stage can be entered, and voltage Vcf across the flying capacitor may remain unchanged until time $t_1$.

Thereafter, the actions during time period $t_0$-$t_1$ may be repeated, where the duration of time period $t_0$-$t_1$ is Ts. In addition, timing circuit 32a may start timing from time $t_0$. Until time $t_2$, timing circuit 32a may have not timed to 3 Ts, but voltage Vcf across the flying capacitor may have been pulled back to near Vin/2. Therefore, normal indication signal 'normal' can be active at time $t_2$, and then the converter may switch to the normal operating mode. Thus, the flying capacitor may begin to be charged and discharged alternately, and the flying capacitor can be discharged first and then charged. At time $t_3$, the flying capacitor may enter the discharging stage, and thus the energy of capacitor $C_{B1}$ can be supplemented, and voltage $V_{cB1}$ may rise to power supply voltage $V_{gate}$ again. Then, the flying capacitor can continue to be charged and discharged alternately.

Figure 8:
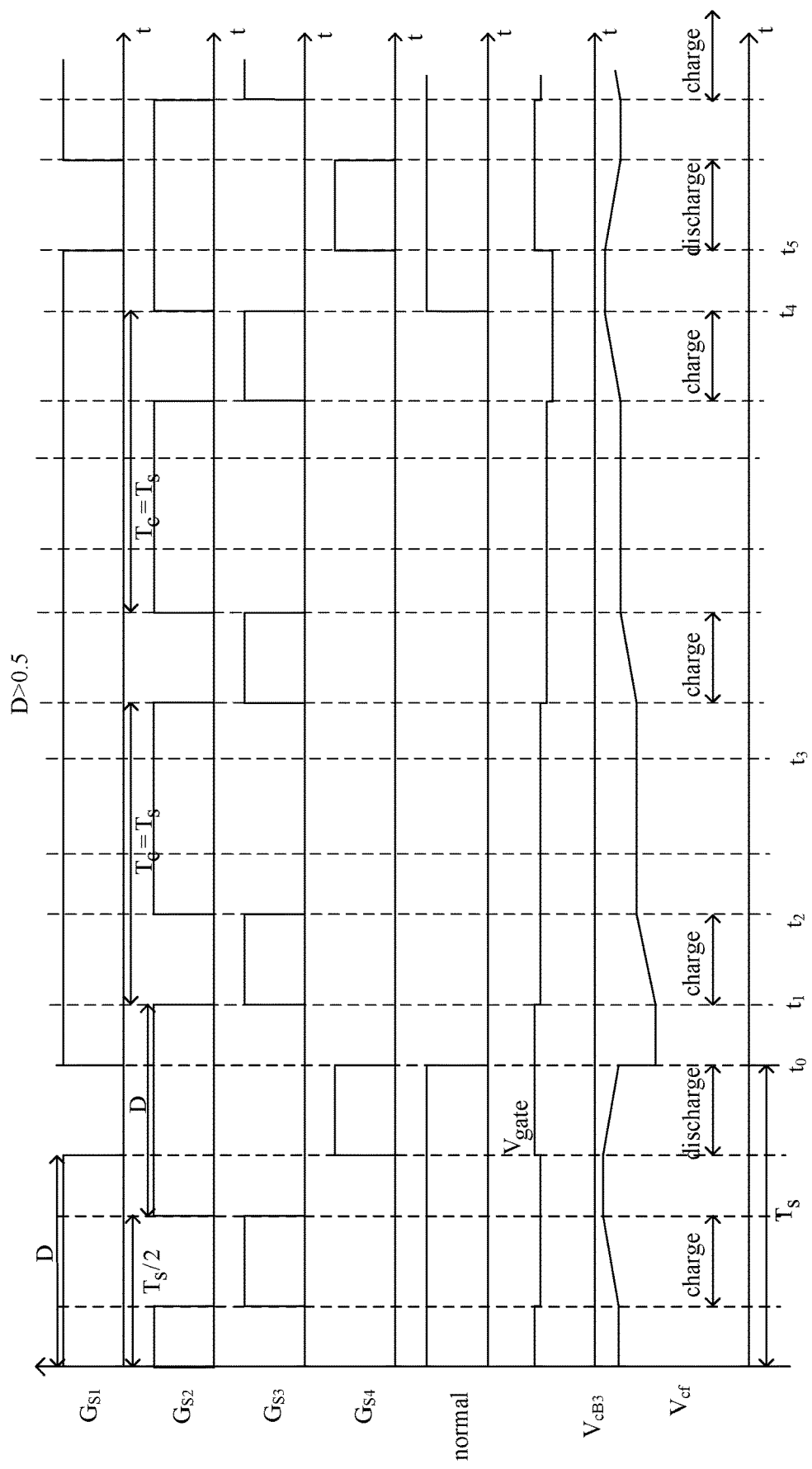
FIG. 8 is a waveform diagram of second example operation of the three-level DC-DC converter when D>0.5, in accordance with embodiments of the present invention.

Referring now to FIG. 8, shown is a waveform diagram of second example operation of the three-level DC-DC converter when D>0.5, in accordance with embodiments of the present invention. In this example, the operating waveform diagram of the three-level Buck converter when voltage Vcf across the flying capacitor is less than lower threshold Vref_L is given. Similarly, in this example, m=2 and N=3 are taken as an example for illustration.

Before time $t_0$, the flying capacitor may alternately be charged and discharged. At time $t_0$, voltage Vcf across the flying capacitor may suddenly drop to below lower threshold Vref_L, such that undervoltage indication signal UV is active and normal indication signal 'normal' is inactive. Thus, the converter may enter the undervoltage operating mode to continuously charge the flying capacitor for three times. Because the flying capacitor is in the discharging stage before time $t_0$, driving signals $G_{S1}$ and $G_{S2}$ can be active at time $t_0$, and the flying capacitor may first enter the holding stage. At time $t_1$, driving signal $G_{S3}$ can change from inactive to active, and power switch S3 may be turned on and power switch S2 turned off, such voltage Vcf across the flying capacitor begins to rise. After the conduction time (1−D)Ts, that is, at time t2, driving signal $G_{S3}$ can change from active to inactive, and driving signal $G_{S2}$ can change from inactive to active. Then, flying capacitor Cf may enter the holding stage until time $t_3$.

After that, the actions during time period $t_0$-$t_3$ can be repeated, and the duration between time period $t_0$-$t_3$ is Tc. In this example, the interval between the starting moments of adjacent charging stages is Tc=mTs/2=Ts. In addition, timing circuit 32a may start timing from time $t_0$. At time $t_4$, timing circuit 32a may have not timed to 3 Ts, but at this time, voltage Vcf across the flying capacitor can be pulled back to near Vin/2, so normal indication signal 'normal' may be active at this time. After that, the converter can switch to the normal operating mode, the flying capacitor may begin to enter the alternating charging and discharging process, and the flying capacitor can be discharged first and then charged. At time $t_5$, the flying capacitor may enter the discharging stage, and the energy of capacitor $C_{B3}$ can be supplemented, such that voltage $V_{cB3}$ rises to power supply voltage $V_{gate}$ again. Then, the flying capacitor may continue to be charged and discharged alternately.

In these examples, when the voltage across the flying capacitor returns to the second threshold range, it can be switched to the normal operating mode, regardless of whether the continuous charging process is completed. Those skilled in the art will recognize that it is also possible to determine the voltage across the flying capacitor after the end of the continuous charging process, in order to determine whether to switch back to the normal operating mode. In addition, the above operating waveforms all take the undervoltage operating mode as an example. It should be understood that if voltage Vcf suddenly rises, far exceeding ½Vin, the voltage across the flying capacitor can be pulled back to the vicinity of Vin/2 by analogy with the above control process. In this way, particular embodiments make up for the shortcoming that the voltage balancing strategy of other approaches may not balance the voltage across the flying capacitor in time under extreme operating conditions by adjusting the charging stage and the discharging stage in the operating process of the three-level DC-DC converter, and may also realize the rapid and active adjustment of the voltage across the flying capacitor.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a three-level DC-DC converter having first, second, third, and fourth power switches coupled in series between an input voltage and a reference ground, and a flying capacitor coupled between a common node of the first and second power switches and a common node of the third and fourth power switches, the method comprising, when a voltage across the flying capacitor is out of a first threshold range, one of:
    a) operating the flying capacitor in a first mode in which the voltage across the flying capacitor is controlled to not be decreased in at least two consecutive first intervals, wherein each first interval is half of a switching period of the three-level DC-DC converter; and
    b) operating the flying capacitor in a second mode in which the voltage across the flying capacitor is controlled not to be increased in at least two consecutive first intervals, such that the voltage across the flying capacitor approaches a predetermined value;
    c) the method further comprising controlling the three-level DC-DC converter to operate in the first mode when the voltage across the flying capacitor is less than a lower threshold of the first threshold range, such that the flying capacitor consecutively enters a charging interval for a plurality of times, wherein the charging interval comprises one charging stage and one holding stage; and
    d) the method further comprising controlling the three-level DC-DC converter to operate in the second mode when the voltage across the flying capacitor is greater than an upper threshold of the first threshold range, such that the flying capacitor consecutively enters a discharging interval for the plurality of times, wherein the discharging interval comprises one discharging stage in and one holding stage.

2. The method of claim 1, further comprising:
    a) controlling the three-level DC-DC converter to operate in a normal operating mode when the voltage across the flying capacitor approaches the predetermined value, such that the flying capacitor is alternately charged and discharged in a charging stage and a discharging stage in each switching period, wherein there is at least one holding stage between two adjacent charging stages and between two adjacent discharging stages; and
    b) controlling the voltage across the flying capacitor to be maintained when in the holding stage.

3. The method of claim 2, further comprising:
    a) controlling the flying capacitor to enter at least one discharging stage during the first mode; and
    b) controlling the flying capacitor to enter at least one charging stage during the second mode.

4. The method of claim 3, further comprising:
    a) controlling the flying capacitor to operate a discharging supplementary mode to be discharged at least once after being charged every N times during the first mode; and
    b) controlling the flying capacitor to operate a charging supplementary mode to be charged at least once after being discharged every N times during the second mode, such that the voltage of a driving power supply capacitor in a driving circuit of the three-level DC-DC converter is boosted,
    c) wherein N is a positive integer greater than 1.

5. The method of claim 4, further comprising:
    a) during the discharging supplementary mode, controlling the flying capacitor to be discharged once and then return to the first mode, or to enter the normal operating mode for a first time and then return to the first mode; and
    b) during the charging supplementary mode, controlling the flying capacitor to be charged once and then return to the second mode, or to enter the normal operating mode for the first time and then return to the second mode.

6. The method of claim 2, wherein a time length of the charging interval and a time length of the discharging interval are each an integer multiple of the first interval.

7. The method of claim 6, wherein:
    a) when a duty ratio is less than 0.5, the charging interval comprises the charging stage with a duration of D×Ts and the holding stage, and the discharging interval comprises the discharging stage with a duration of D×Ts and the holding stage;
    b) when the duty ratio is greater than 0.5, the charging interval comprises the charging stage with a duration of Ts×(1−D) and the holding stage, and the discharging interval comprises the discharging stage with a duration of Ts×(1-D) and the holding stage; and
    c) Ts is the switching period and D is the duty ratio of the first power switch.

8. The method of claim 6, wherein:
    a) when a duty ratio is less than 0.5, in each charging interval in the first mode, the first power switch is controlled to be turned on once and the second power switch is not turned on;
    b) a conduction time of the first power switch is D×Ts;

c) in each discharge interval in the second mode, the second power switch is controlled to be turned on once and the first power switch is not turned on;
d) a conduction time of the second power switch is D×Ts;
e) driving signals of the first and fourth power switches are complementary;
f) driving signals of the second and third power switches are complementary; and
g) Ts is the switching period and D is the duty ratio of the first power switch.

9. The method of claim 6, wherein:
a) when a duty ratio is greater than 0.5, in each charging interval in the first mode, the third power switch is controlled to be turned on once and the fourth power switch is not turned on, wherein the turn-on time of the third power switch is Ts×(1-D);
b) in each discharge interval time under the second mode, the fourth power switch is controlled to be turned on once and the third power switch is not turned on;
c) the turn-on time of the fourth power switch is Ts×(1-D);
d) driving signals of the first and fourth power switches are complementary;
e) driving signals of the second and third power switches are complementary; and
f) Ts is the switching period and D is the duty ratio of the first power switch.

10. The method of claim 2, further comprising controlling the voltage across the flying voltage to be equal to the predetermined value when in the normal operating mode.

11. A control circuit for a three-level DC-DC converter having first, second, third, and fourth power switches coupled in series between an input voltage and a reference ground and a flying capacitor coupled between a common node of the first and second power switches and a common node of the third and fourth power switches, wherein the control circuit is configured to one of:
a) control the flying capacitor to operate in a first mode in which the voltage across the flying capacitor is controlled to not be decreased in at least two consecutive first intervals, wherein each first interval is half of a switching period of the three-level DC-DC converter; and
b) control the flying capacitor to operate in a second mode in which the voltage across the flying capacitor is controlled to not be increased in at least two consecutive first intervals when a voltage across the flying capacitor is out of a first threshold range, such that the voltage across the flying capacitor approaches a predetermined value;
c) wherein the control circuit is further configured to control the three-level DC-DC converter to operate in the first mode when the voltage across the flying capacitor is less than a lower threshold of the first threshold range, such that the flying capacitor consecutively enters a charging interval for a plurality of times, wherein the charging interval comprises one charging stage and one holding stage; and
d) wherein the control circuit is further configured to control the three-level DC-DC converter to operate in the second mode when the voltage across the flying capacitor is greater than an upper threshold of the first threshold range, such that the flying capacitor consecutively enters a discharging interval for the plurality of times, wherein the discharging interval comprises one discharging stage in and one holding stage.

12. The control circuit of claim 11, further comprising:
a) a mode switching module configured to receive the voltage across the flying capacitor, and to generate different indication signals according to an extent that the voltage across the flying capacitor deviates from the predetermined value to control the three-level DC-DC converter to switch between different operating modes;
b) a feedback compensation circuit configured to generate a feedback compensation signal according to an error between a feedback signal representing an output voltage and a reference signal representing an expected value of the output voltage; and
c) a driving generation circuit configured to generate corresponding driving signals according to the feedback compensation signal and the indication signal, thereby controlling the three-level DC-DC converter to function in a corresponding operating mode.

13. The control circuit of claim 12, wherein the mode switching module is configured to:
a) generate an active undervoltage indication signal to instruct the three-level DC-DC converter to enter the first mode when the voltage across the flying capacitor is less than a lower threshold of the first threshold range, such that the flying capacitor consecutively enters a charging interval for a plurality of times; and
b) generate an active overvoltage indication signal instruct the three-level DC-DC converter to enter the second mode when the voltage across the flying capacitor is greater than an upper threshold of the first threshold range, such that the flying capacitor enters a discharging interval for the plurality of times.

14. The control circuit of claim 13, wherein:
a) when the voltage across the flying capacitor approaches the predetermined value, the mode switching module is configured to generate an active normal indication signal to instruct the three-level DC-DC converter to enter a normal operating mode, such that the flying capacitor is alternately charged and discharged in a charging stage and a discharging stage in each switching period; and
b) at least one holding stage is between two adjacent charging stages and between two adjacent discharging stages, wherein in the holding stage, the voltage across the flying capacitor is controlled to be maintained.

15. The control circuit of claim 12, wherein the driving generation circuit comprises:
a) a first driving generation circuit configured to generate a first control signal according to the feedback compensation signal and a first sawtooth wave signal, and to generate a second control signal according to the feedback compensation signal and a second sawtooth wave signal; and
b) a second driving generation circuit configured to generate the drive signals according to the first and second control signals and respective indication signals.

16. The control circuit of claim 14, wherein the control circuit is configured to:
a) control the flying capacitor to enter a discharging supplementary mode to be discharged at least once after being charged every N times during the first mode; and
b) control the flying capacitor to enter a charging supplementary mode to be charged at least once after being discharged every N times during the second mode, thereby boosting the voltage of a driving power supply capacitor in a driving circuit of the three-level DC-DC converter,
c) wherein N is a positive integer greater than 1.

17. The control circuit of claim 16, wherein the control circuit is further configured to one of:
   a) control the flying capacitor to be discharged once and then return to the first mode, or enter the normal operating mode for a first time and then return to the first mode during the discharging supplementary mode; and
   b) control the flying capacitor to be charged once and then return to the second mode, or enter the normal operating mode for the first time and then return to the second mode during the charging supplementary mode.

18. The control circuit of claim 17, wherein a time length of the charging interval and a time length of the discharging interval are each an integer multiple of the first interval.

* * * * *